United States Patent [19]

Del Pino Millan

[11] Patent Number: 4,892,995
[45] Date of Patent: Jan. 9, 1990

[54] ELECTRIC PORTABLE DESOLDERING IRON

[76] Inventor: Bienvenido Del Pino Millan, Sector Foresta 24, Tres Cantos, Colmenar Viejo, Madrid, Spain

[21] Appl. No.: 195,137

[22] Filed: May 17, 1988

Related U.S. Application Data

[63] Continuation-in-part of Ser. No. 116,017, Oct. 30, 1987, abandoned.

[30] Foreign Application Priority Data

Nov. 4, 1986 [ES] Spain .................................. 8602897
Oct. 19, 1987 [ES] Spain .................................. 8702978

[51] Int. Cl.⁴ .............................................. B23K 3/04
[52] U.S. Cl. .................................. 219/230; 219/236; 219/238; 228/20
[58] Field of Search ............... 219/230, 236–239; 228/19, 20 R, 57, 51–55, 20 HT; 15/341, 344

[56] References Cited

U.S. PATENT DOCUMENTS

| | | | |
|---|---|---|---|
| 2,960,591 | 11/1960 | Brillinger | 228/20 HT |
| 4,206,864 | 6/1980 | Rauchwerger | 219/240 |
| 4,318,504 | 3/1982 | Rauchwerger | 228/20 HT |
| 4,568,011 | 2/1986 | DeArmitt et al. | 228/20 HT |
| 4,660,249 | 4/1987 | Popovic | 15/341 |

FOREIGN PATENT DOCUMENTS

| | | | |
|---|---|---|---|
| 2404698 | 8/1975 | Fed. Rep. of Germany | 228/20 HT |
| 2644946 | 4/1978 | Fed. Rep. of Germany | 219/230 |
| 0157774 | 12/1982 | German Democratic Rep. | 219/230 |

Primary Examiner—M. H. Paschall
Attorney, Agent, or Firm—McGlew & Tuttle

[57] ABSTRACT

Automatic portable unsolderer consisting of a solenoid supplied by alternating current, a cylinder whose piston has a rod consisting the core of said solenoid, including too a reservoir and a heating member, all of them axially engaged as above-mentioned. Through the heating member end, the material that has to be unsoldered is melted and through operation of the solenoid, the piston draws back and suctions said material, which is collected, in a solid condition, in the reservoir which includes a retaining member, easily removable, and a threaded plug. On the outlet of the reservoir a one-way valve is disposed so that the air compressed by the piston, through a return spring that encircles the rod, doesn't flow through the suction conduct avoiding in such manner that the air can drag soldering material particles. The ejected air is by-passed through a side hole provided with a one-way valve that is reversely oriented.

20 Claims, 5 Drawing Sheets

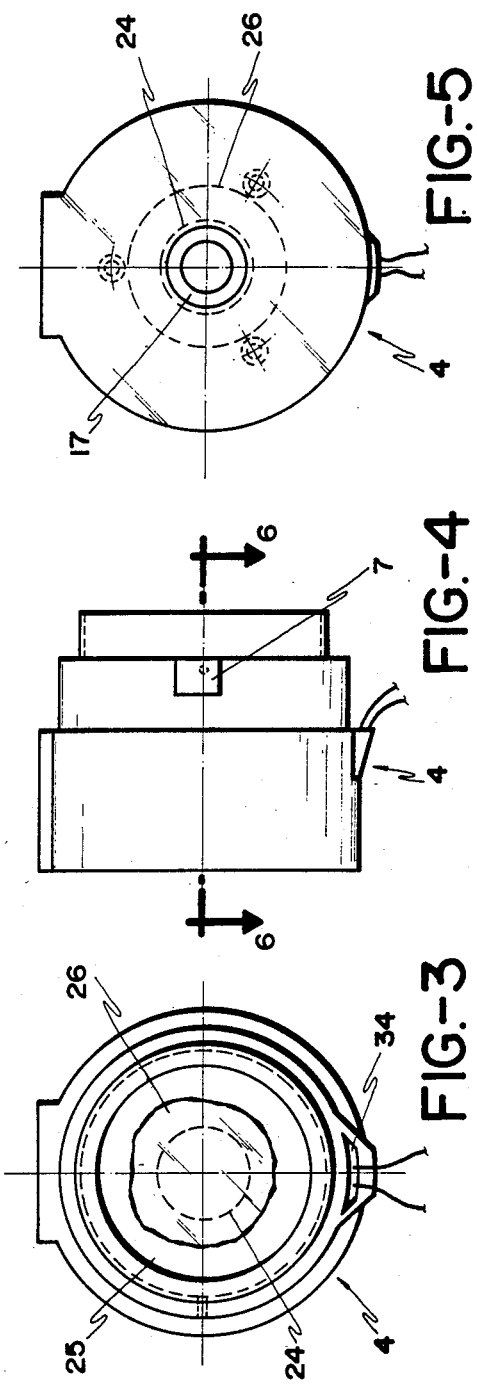

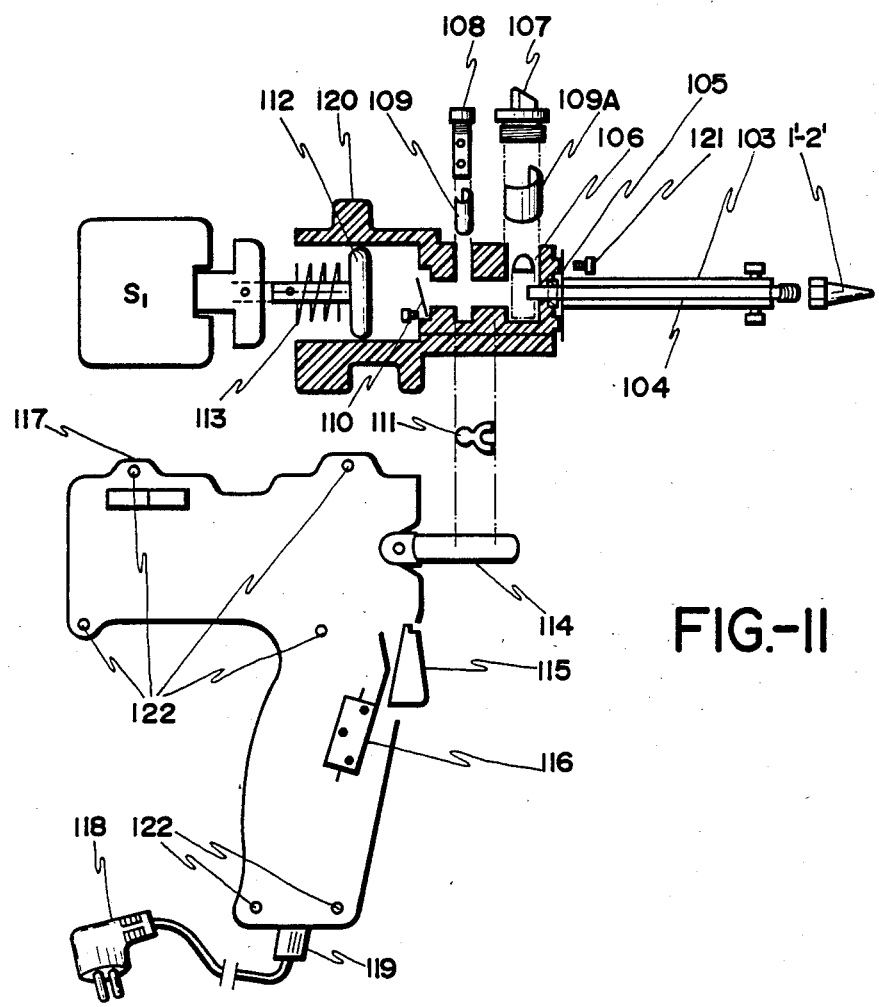
FIG.-II

ELECTRIC PORTABLE DESOLDERING IRON

This is a continuation-in-part application of application Ser. No. 116,017 filed Oct. 30, 1987 for an electric portable desoldering iron now abandoned.

BACKGROUND OF THE INVENTION

Field Of The Invention

This invention refers to an automatic portable desoldering iron according to the type used in electronics application.

Conventionally, in the industry and, in particular in electronics, the unsolderers or desoldering irons which are used belong to two important groups: stationary unsolderers or unsoldering units, and manual unsolderers.

The stationary unsolderers consist of a system that continuously pumps the welding material, that is, by pumping air through a conductor having an end with an electric resistance that holds at a given temperature. The conductor having an end forming the unsoldering tip.

These unsolderers or unsoldering units have some disadvantages, among which is the limitation caused by their immovability. Such devices are not adapted to applications by users that require a displacement. Such devices have the further disadvantage related to the sophisticated unsolderers.

Among these stationary unsoldering units there are those which include a thermostat system to avoid the cooling of the unsolderer tip due to the continuous flow of the air under pressure. Such a feature significantly increases the cost of these units.

The second group of unsolderers consists of manual unsolderers, among which are bulb unsolderers and piston unsolderers. The bulb unsolderers, like all the unsolderers, includes a conductor on whose end is a resistance. Tin is pumped through the spring bulb which pumps after compressing its walls. The piston unsolderers, as indicated by their name, are manual devices that use a small piston, manually operated, to draft at the welding material which goes to a small reservoir included in the same device.

This type of unsolderers, which are movable and less expensive than the stationary unsolderers, have significant disadvantages. First, these devices are much slower because the compression of the bulb or piston causes the exhausting of the welding material contained in the same bulb or reservoir, depending on the type, whereby this operation must be carried out in a direction different from the drafting direction, otherwise, there is the risk of being burned by the welding material expelled by the device. Therefore, these devices are very slow and uncomfortable for the user that must shift the unsoldered after each drafting. The steady flow of tin in both directions inside the conduct always causing the frequent hamming of this type of unsolderers.

It must be noted, as a factor causing the above-mentioned slow and uncomfortable use, that this device requires the user to employ both hands for unsoldering.

All these drawbacks cause the manual unsolderers devices with a poor effectiveness and suitability, to be restricted to jobs that don't require high accuracy.

SUMMARY AND OBJECT OF THE INVENTION

The automatic portable unsolderer of this invention consists of a conventional heating member with a draft conductor for the unsoldering material, which has an outer threaded end for the engagement of different types of nozzles or tips used to melt the material. The conductor is suitably sized so that the melt material can flow through it when it is in a fluid condition and solidifies just after arriving at the reservoir.

The heating member is axially fitted through a flange and some screws to a refractory member, generally cylindrical-shaped, so that the conducts goes through a hole, remaining engaged by a eflon refractory bushing. In the member there is mounted a reservoir, which is provided with a through cylindrical note that is threaded to fit a plug, having a roar hole coaxially with the heating conduct, that communicates with a chamber whose diameter is higher than said hole.

The reservoir is provided with a retaining cylindrical member, loose fitted, with an incomplete axial groove, to locate the portion of the heating conduct that remains introduced in said reservoir. The height of the retaining member is such that its lower base rests on the bottom of the container and its higher base frees a small portion of the above-mentioned rear hole.

The retaining hole has on the top two diametrically opposed holes for the fitting of the ends of a wire-shaped member like a clamp, so that the retaining member is easily removable to detach the tin adhered to its walls.

A main feature of this invention is two one-way valves reversely oriented on the refractory member. The valve that prevents the air going through the draft conduct, consists of an elastic lug disposed between the rear hole and the chamber to which it communicates. The second valve is another spring lug that covers outwards a radial hole made on the wall of said chamber. This second valve prevents the drafted air going through the suction conduct.

On the rear side of the refractory member a screw is provided to fit a neumatic cylinder whose piston is provided with a rod that constitutes the core of a solenoid supplied by an alternating current. During the air intake and exhaust motions, the rod slides in a locating cylindrical member fitted through a crew thread to the rear side of the cylinder jacket, and on which is axially disposed the solenoid to which remains fastened by some conventional fixing member (spring, circlip, pin, and so on), disposed at the rear end of the locating part.

In the rod of the piston is mounted a tapered spring that rests on a ring staggering of the locating member, and serves as returning member.

The cylinder jacket has on its rear side some holes that communicate the rear chamber with the outside to exhaust the air.

The unsolderer of the invention may include a diode mounted in series with the resistance of the heating member, so to be able to select a thermal valve reduced to by half when the apparatus is not being used.

All the features listed in this specification define an automatic and portable unsoldering device which constitutes an innovation in the related art, since it embraces the advantages of devices existing at present, being clearly superior with regard to suitability, effectiveness and handling.

Accordingly, it is an object of the invention to provide an automatic portable desolderer including a tubular heating member to melt the soldering material connected to a housing which defines a reservoir for collecting desoldering material. The housing has an opening communicating with the tubular heating member. A cylinder is provided which defines a working space. The cylinder has an opening or passage which is connected to the reservoir housing to provide fluid communication between the reservoir housing and the cylinder. The cylinder has a relief valve opening adjacent the connection with the housing. A piston is positioned within the cylinder for reciprocal movement between a first and second position. The piston includes a piston rod formed of a magnetically attractable material. A solenoid coil is positioned adjacent the cylinder. The piston rod passes into solenoid coil to form a solenoid core which is pulled to a central position when the coil is energized. A spring member positioned within the cylinder urges the piston away from the solenoid coil. A first one way valve is positioned between the cylinder and the reservoir blocking fluid flow in the housing passage in the direction from the cylinder to the reservoir and allows fluid flow in the direction from the reservoir to the cylinder. A second one-way valve is connected to the relief valve opening preventing fluid from entering the cylinder and allowing fluid to exit the cylinder. This arrangement allows the piston to normally be urged by the spring into a rest position. When the solenoid is energized, the piston moves away from its rest position drawing soldering material through the nozzle fitted in the end of the heating member and through the tubular heating member to the reservoir. The piston may then return to its rest position by action of the spring when the solenoid is de-energized. The air which has come into the cylinder working space exits through the relief valve opening past the second one way valve.

This advantage construction provides a portable apparatus with automatic operation. By providing a plug or the like in the reservoir housing, the soldering material may be removed in a simple manner. Construction provides a reduced maintenance device which is easy to handle and comfortable to handle. The device provides for a very fast apparatus which does not jam and may be used in a manner similar to conventional desolderers. Additionally, as many desoldering steps may be carried out without moving the location of the device.

It is a further object of the invention to provide a portable automatic desoldering apparatus which is simple in design, rugged in construction, and economical to manufacture.

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIGS. 1 and 2. are sectional views of elements constituting the unsolderer of the invention;

FIG. 3. is a rear elevational view of the refractory member containing the reservoir and the two one-way valves;

FIG. 4. is a rear elevational view of the refractory member shown;

FIG. 5. is a rear elevational view of the refractory member shown in FIGS. 3 and 4;

DESCRIPTION OF THE PREFERRED EMBODIMENTS

Figure 1:
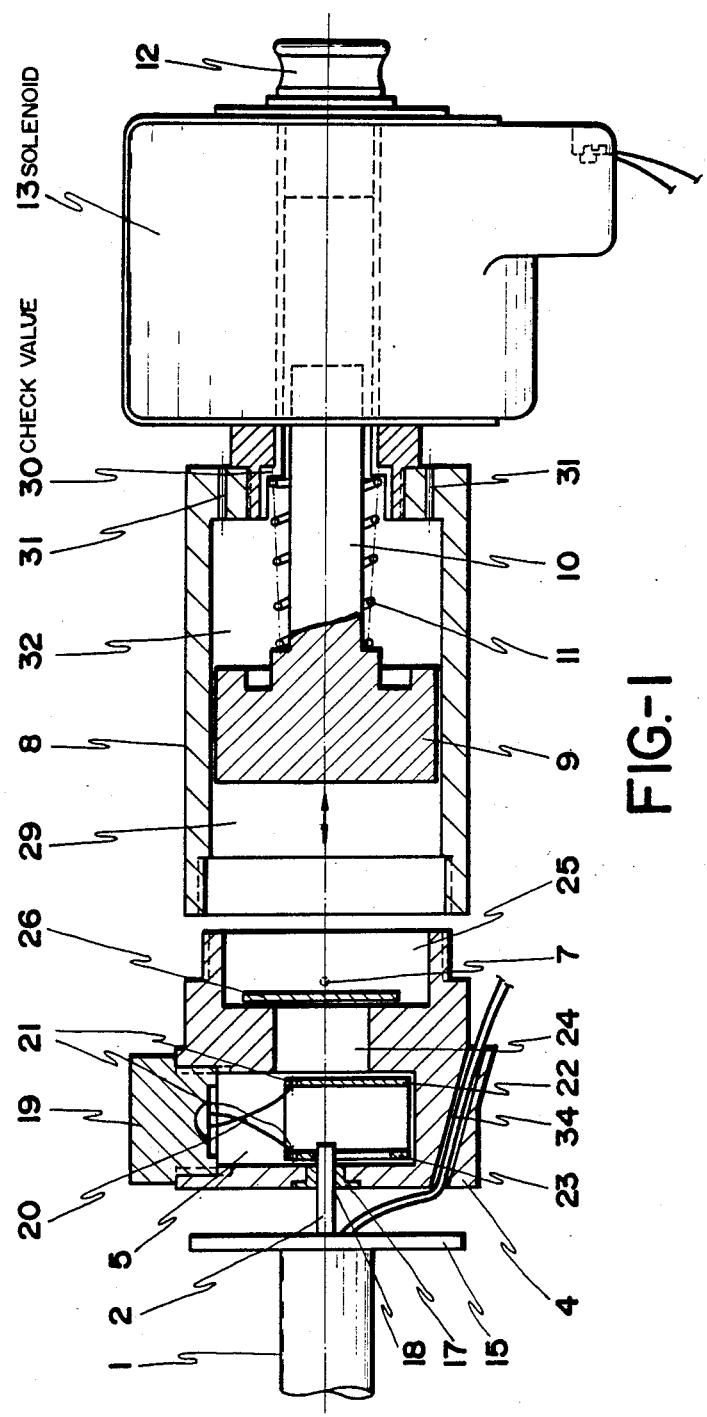
Figure 7:
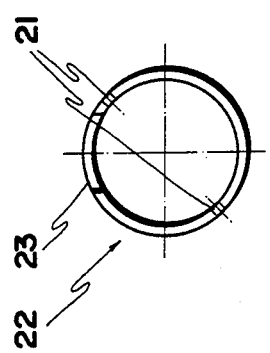
FIG. 7. is a view of the retaining cylindrical member included in a reservoir according to the invention.
Figure 9:
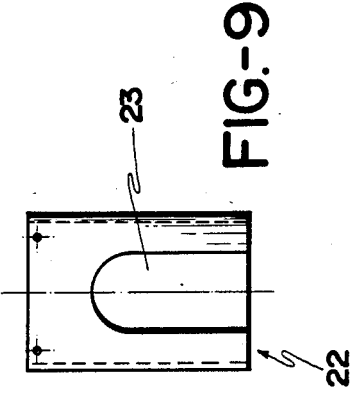
FIG. 9. is a side view of a retaining member shown in the preceding FIG. 8.
Figure 6:
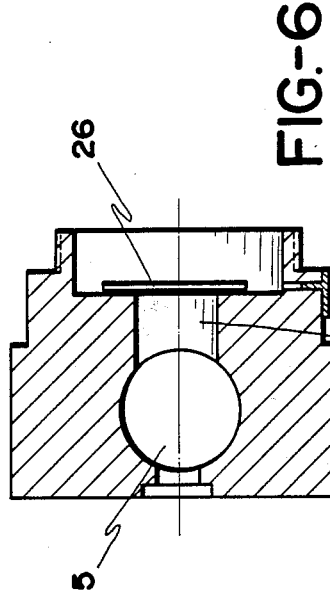
FIG. 6. is a sectional view of the front of a refractory member according to the invention.
Figure 8:
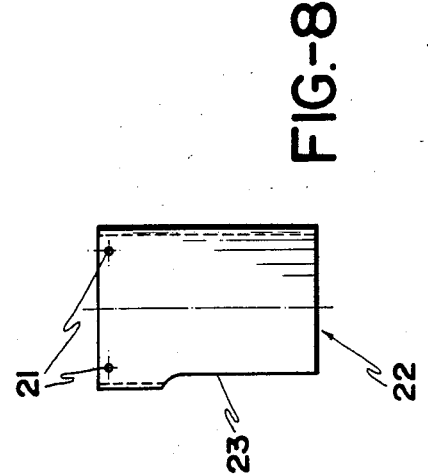
FIG. 8. is an elevational view of a retaining member according to the invention.
Figure 10:
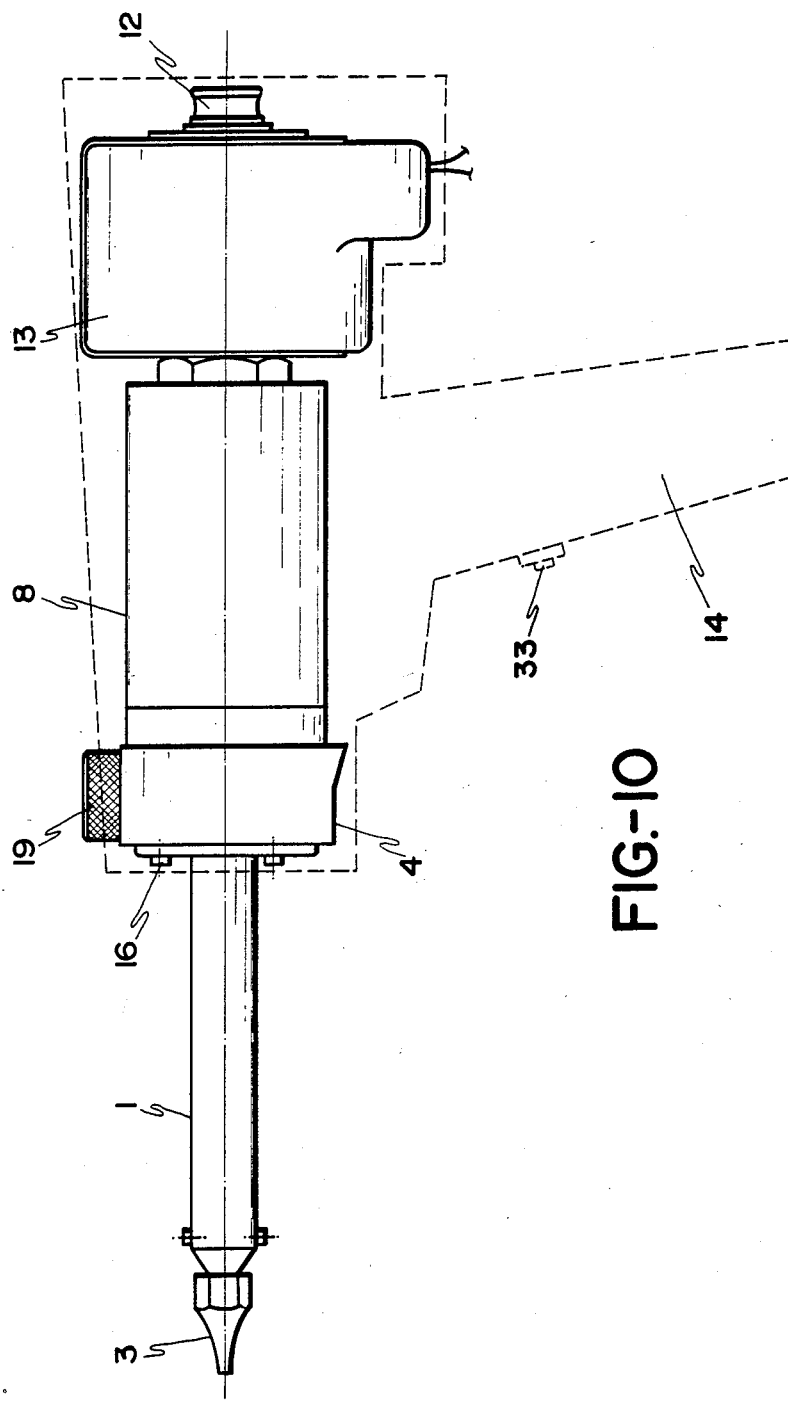
FIG. 10. is a schematic view of the unsolderer of the invention provided with a housing; and, FIG. 11. is an exploded view of a further embodiment of the invention.

Referring to the drawings in particular, which includes a heating member 1 provided with its relative suction conduit 2 and a nozzle or tip 3. A refractory member 4 including a reservoir 5 and one-way valves 6 and 7 are provided. A neumatic cylinder 8 with its relative piston 9 and rod 10, a return tapered spring 11, a locating cylindrical member 12, a solenoid supplied by alternating current supply 13 and an ergonomic housing 14 are also provided.

The heating member 1 includes a suction conduit 2 spacially sized so that the unsoldering material arrives at the reservoir 5 at the suitable temperature. The end of conduit 2 has a screw thread for engagement with removable nozzle 3.

The heating member 1 is fitted to a refractory member through a flange 15 and screws 16, while a portion of the suction conduit 2 remains introduced, with a refractory bushing 17, in an axial hole 18 disposed in the refractory member 4, and communicating with the reservoir 5 for collection and removal of the soldering material.

The reservoir 5 shaped as a transverse cylindrical hole made in the refractory member 4, is threaded so as to accommodate a locking plug 19. Inside the reservoir a retaining cylinder member 22 is loosely fitted showing in its top surface two diametrically opposed holes for fixing the wire member 20. Wire member 20 serves as a gripper to remove the retaining member 22.

The refractory member 4, of generally cylindrical-shape, has a hole 24 coaxial with the hole 18 housing the refractory bushing 17 and is disposed in the generating surface of the reservoir 5 diametrically opposed to the latter. This hole 24 coaxially communicates with a cylindrical chamber 25 having a larger diameter than hole 24. The hole 24 and said chamber 25 are separated by a spring lug 26 that defines the one-way valve 6.

In the wall of the chamber 25 a hole has been made with an outer spring lug 28 operating as one-way vale 7 reversely oriented with regard to the one-way valve 6.

Through an outer thread provided in the refractory member 4 a neumatic cylinder 8 is fitted whose intake chamber 29 communicates with the cylindrical chamber 25. The rod 10 of the piston 9 of the cylinder 8, constitutes the core of a solenoid 13 supplied by an alternating current and it has a return tapered spring 11. The cylinder 8 is fitted through a screw thread to a locating cylindrical member 12 coaxial with the solenoid 13 and integral with the same through suitable means (spring, pin, circlip, and so on), so that the rod 10 constitutes the core of said solenoid and can move by exciting this, and to withdraw driven by the return spring 11 whose rear ends abut against a ring-shaped step 30 disposed in the locating cylindrical member 12.

The withdrawing movement of the rod is easily carried out through exhaust ports 31 placed in the jacket of the cylinder rear chamber 32.

The above-mentioned automatic portable unsolderer is shown engaging an ergonomic housing 14 enveloping suitably all the parts and in which is disposed the switch actuator 33.

The leads of the resistance of the heating member 1 pass through the hole 34 provided in the refractory member 4.

The operation of the unsolderer proposed by the invention is as follows:

After connecting an electric power source to the heating member 1 and the alternating current solenoid 13, the unsoldering operation can be carried out.

The unsoldering nozzle or tip 3 contacts the material to be unsoldered and when this is melted, the switch 33 provided in the housing is operated, exciting the solenoid 13 that attracts the rod 10 and, therefore, the pluger 9, causing the suction of the air through the valve 6 and the suction of the unsoldering material which goes, after melting, through the suction conduct 2 and arrives at the reseroir 5 in a solid condition. The retaining member 20 prevents the drafted material from passing through the hole 24 to the cylinder 8, thereby avoiding damage of the jacket, piston 9 and the remaining parts.

When the operator stops depressing the switch 33 the piston 9 goes back to its starting position due to the tapered spring 11 that abuts against the ring-shaped step 30 of the locating member 12. The air driven by the piston 9 is by-passed through the valve 7.

In this way, as many operations as desired can be carried out without moving the device. When the operator wishes to empty the reservoir, only the plug 19 must be unscrewed, to remove the retaining member 23 through the wire member 20 and to disengage the unsolderer.

A further embodiment of the invention refers to an automatic portable unsolderer of the kind of the unsolderers used in electronics. This automatic portable unsolderer comprises a solenoid driven by alternating current, and a cylinder in which a plunger is reversable, and has a rod which is mechanically attached to the core of the solenoid. The device includes a reservoir and a heating member having an end which melts the unsoldering material and, by driving the solenoid, draws back the plunger that suctions the material which is collected. This material is in a solid state and is collected in a reservoir. All these components are incorporated in an integral body which properly engages the different parts of the assembly.

In practice, the plunger that was incorporated in the unsolderer covered, could be damaged by small particles from the unsoldered material. Despite the different sheltering systems, such particles adhered to the plunger walls, which due to its metallic nature, would suffer an eventual early wear.

This problem has been solved with a new plunger made of a resilient material (synthetic rubber).

This unsolderer is provided with a filter cartridge having its relative support that helps to increase positively the efficiency of the unsolderer. A second filter is mounted in the unsoldering particles reservoir following the suction tube.

The numerals 1' and 2' refer to the unsolderer point that is brought near to the material which is to be unsoldered.

The numeral 103 refers to a resistance element surrounding a suction tube referred to as 104.

The part 105 is the bushing and part 106 is the retaining tube.

The reservoir plug is referred to as 107 and the filter plug 100. The numeral 109 refers to the main filter and 109 "A" refers to the second filter.

The inner and outer valves are referred to as 110 and 111 respectively. An outer valve cover 114 is also provided.

The assembly of the plunger and the relative spring are referred to as 112 and 113. Plunger 112 is of a resilient anti-adhesive material.

The part 115 is the switch key and the No. 116 refers to the switch.

The parts 117 and 118 refer to the handles and the pin to connect through the cord to the mains.

The numeral 119 refers to the cord shelter and No. 120 to the block-cast cylinder assembly.

The numerals 121 and 122 refer to the screwed holes to fix the various components of the unsolderer.

It can be clearly appreciated that the innovations introduced in this addition patent essentially correspond to the parts referred to as 108, 109, 109A, 112 and 120, which represent improved additional features unsolderer with regard to the main patent.

In operation, the second embodiment of the invention (shown in FIGS. 11 and 12) functions in a similar manner to the first embodiment discussed above. The unsoldering nozzle or tip 1' and 1' are brought near to the material which is to be desoldered. When this material is melted, the switch including 116 and part 115 is operated which energizes the solenoid $S_1$ which urges piston rod associated with the piston or puncher 112 toward the solenoid coil $S_1$. This movement of the plunger or piston 112 causes suction of air through the valve 110. This also causes the suction of the soldering material which moves after melting, through the suction tube 104 and into the reservoir 130. As can be seen in FIG. 11, a reservoir plug 107 is provided for removal of the solder material. A main filter 109 is provided downstream of the main reservoir portion 130. Additionally, a second filter 109a is provided. A filter plug 108 is provided for removal of the filter 109.

When the operator stops depressing the switch 115,116, the piston or plunger 112 goes back to its rest position due to the urging of spring 113. The air driven by the piston or plunger 112 then escapes through the outer or relief valve 111.

While specific embodiments of the invention have been shown and described in detail to illustrate the application of the principals of the invention, it will be understood that the invention may be embodied otherwise without departing from such principles.

What is claimed is:

1. An automatic portable desolderer comprising: a tubular heating member, to melt soldering material defining a suction conduit, a housing defining a reservoir for collection of the soldering material, the housing having an opening communicating with said tubular heating member suction conduit; a cylinder connectable to said housing, defining a working space, a passage in said housing providing fluid communication between said reservoir and said cylinder working space relief valve means for blocking fluid flow in the direction from exterior of said cylinder to said cylinder and allowing fluid flow from said cylinder to the exterior of said cylinder; a piston positioned within said cylinder for reciprocal movement therein, said piston having a piston rod formed of a magnetically attractable material; a solenoid coil positioned adjacent said cylinder, said piston rod forming a solenoid core which is pulled to a central position when the coil is energized; a spring member positioned within said cylinder for urging said piston away from said solenoid coil; first one-way valve means positioned between said cylinder and said reservoir for blocking fluid flow in the direction from said cylinder to said reservoir and allowing fluid to flow in the direction from said reservoir to said cylinder; and, second one-way valve connected to said relief valve means preventing fluid from entering said cylinder and allowing fluid to exit said cylinder, when said coil is energized, said piston drawing air through said first one way valve which draws melted soldering material into said reservoir, when said solenoid coil is de-energized, said piston moving toward said reservoir and fluid within said working chamber escaping from said cylinder through said relief valve means, said housing including a reservoir opening and a locking plug sealing said reservoir from the exterior of said housing, said locking plug being removable to remove solder from said reservoir, a solder retaining member being positioned in said reservoir to retain solder as it moves from said suction conduit, said retaining member being removable from said reservoir through said reservoir opening.

2. An automatic portable desolderer according to claim 1, wherein: said housing has two diametrically disposed holes on a top surface, to engage the ends of a clamp-shaped wire member used for removal of said solder material, said clamp-shaped wire member extending into said reservoir.

3. An automatic portable desolderer according to claim 1, wherein: said tubular heating member has an outer threaded portion adapted to engage different types of nozzle elements.

4. An automatic portable desolderer according to claim 1, wherein: said piston rod is positioned co-axially with said solenoid coils, said solenoid coil including a solenoid coil housing with means to attach said solenoid coil housing to said cylinder.

5. An automatic portable desolderer according to claim 1, wherein: said cylinder includes at least two holes communicating with a non-working space defined between said piston and said solenoid coil to admit and expel air from the non-working cylinder portion.

6. An automatic portable desolderer according to claim 1, wherein: said heating member, said reservoir housing, said cylinder and said solenoid coil are axially engaged and disposed inside an ergonomic housing provided with means to operate the device.

7. An automatic portable desolderer according to claim 1, wherein: said piston is formed of a resilient anti-adhesive material and said housing and said cylinder are formed integral of a block-cast body.

8. An automatic portable desolderer according to claim 1, wherein: a filter cartridge is positioned between said cylinder and said reservoir to collect the soldering material.

9. An automatic portable desolderer, comprising: a tubular heating member to melt soldering material, said tubular heating member defining a suction conduit; a housing defining a reservoir for collection of the soldering material, the housing having an opening communicating with said tubular heating member suction conduit; a cylinder connectable to said housing, defining a working space, a passage in said housing providing fluid communication between said reservoir and said cylinder working space, said cylinder, said housing reservoir and said suction conduit each having a central axis, each of said cylinder, said housing reservoir and said suction conduit being coaxial; one-way relief valve means for blocking fluid flow in the direction from exterior of said cylinder to said cylinder and allowing fluid flow from said cylinder to exterior of said cylinder; a piston positioned within said cylinder for reciprocal movement therein, said piston having a piston rod formed from a magnetically attractable material; a solenoid coil positioned adjacent said cylinder, said piston rod forming a solenoid core which is pulled to a central position when the coil is energized; first one-way valve means positioned between said cylinder and said reservoir for blocking fluid flow in the direction from said cylinder to said reservoir and allowing fluid to flow in the direction from said reservoir to said cylinder; and, second one-way valve connected to said relief valve opening preventing fluid from entering said cylinder and allowing fluid to exit said cylinder, when said coil is energized, said piston drawing air through said first one way valve which draws melted soldering material into said reservoir, when said solenoid coil is de-energized, said piston moving toward said reservoir and fluid within said working chamber escaping from said cylinder through said relief valve passage.

10. An automatic portable desolderer according to claim 9, wherein: said housing has two diametrically disposed holes on a top surface, to engage the ends of a clamp-shaped wire member used for removal of said solder material, said clamp-shaped wire member extending into said reservoir.

11. An automatic portable desolderer according to claim 9, wherein: said tubular heating member has an outer threaded portion adapted to engage different types of nozzle elements.

12. An automatic portable desolderer according to claim 9, wherein: said piston rod is positioned co-axially with said solenoid coils, said solenoid coil including a solenoid coil housing with means to attach said solenoid coil housing to said cylinder.

13. An automatic portable desolderer according to claim 9, wherein: said cylinder includes at least two holes communicating with a non-working space defined between said piston and said solenoid coil to admit and expel air from the non-working cylinder portion.

14. An automatic portable desolderer according to claim 9, wherein: said heating member, said reservoir housing, said cylinder and said solenoid coil are axially engaged and disposed inside an ergonomic housing provided with means to operate the device.

15. An automatic portable desolderer according to claim 9, wherein: said piston is formed of a resilient anti-adhesive material and said housing and said cylinder are formed integral of a block-cast body.

16. An automatic portable desolderer according to claim 9, wherein: a filter cartridge is positioned between said cylinder and said reservoir to collect the soldering material.

17. An automatic portable desolderer, comprising: a tubular heating member to melt soldering material defining a suction conduit; a housing defining a reservoir for collection of the soldering material, the housing having an opening communicating with said tubular heating member suction conduit; a cylinder connectable to said housing, defining a working space, a passage in said housing providing fluid communication between said reservoir and said cylinder working space, said cylinder having a relief valve opening; a piston positioned within said cylinder for reciprocal movement therein, said piston having a piston rod formed from a magnetically attractable material; a solenoid coil positioned adjacent said cylinder, said piston rod forming a solenoid core which is pulled to a central position when the coil is energized; first one-way valve means positioned between said cylinder and said reservoir blocking fluid flow in the direction from said cylinder to said reservoir and allowing fluid to flow in the direction from said reservoir to said cylinder; second one-way valve connected to said relief valve opening preventing fluid from entering said cylinder and allowing fluid to exit said cylinder, when said coil is energized, said piston drawing air through said first one way valve which draws melted soldering material into said reservoir, when said solenoid coil is de-energized, said piston moving toward said reservoir and fluid within said working chamber escaping from said cylinder through said relief valve passage; a filter chamber positioned between said reservoir and said cylinder, each of said suction conduit, said reservoir, said filter chamber and said cylinder having a central axis, said suction conduit, said reservoir, said filter chamber and said cylinder being coaxial defining a straight fluid path from said suction conduit to said cylinder; and, a filter cartridge positioned in said filter chamber.

18. An automatic portable desolderer according to claim 17 further comprising: a spring member positioned within said cylinder for urging said piston away from said solenoid coil.

19. An automatic portable desolderer according to claim 17, further comprising an opening in said filter chamber and a filter plug positionable in said opening for sealing said filter chamber from the outside, said filter plug being removable to remove said filter cartridge.

20. An automatic portable desolderer according to claim 17, further comprising a second filter cartridge positionable in said reservoir, solder retaining member means being positioned in said reservoir adjacent said second filter cartridge to retain solder as it issues from said suction conduit, said retaining member means being removable from said reservoir through a reservoir opening defined in said housing, said reservoir opening being sealable by a locking plug to seal said reservoir from the exterior of said housing.

* * * * *